May 5, 1959 S. DARLINGTON ET AL 2,885,494

TEMPERATURE COMPENSATED TRANSISTOR AMPLIFIER

Filed Sept. 26, 1952

INVENTORS: S. DARLINGTON
J. H. FELKER

BY N. S. Ewing
ATTORNEY

United States Patent Office 2,885,494

Patented May 5, 1959

2,885,494

TEMPERATURE COMPENSATED TRANSISTOR AMPLIFIER

Sidney Darlington, Passaic Township, Morris County, and Jean H. Felker, Livingston, N.J., assignors to Bell Telephone Laboratories, Incorporated, New York, N.Y., a corporation of New York Application September 26, 1952, Serial No. 311,770

6 Claims. (Cl. 179—171)

This invention relates, in general, to transistor amplifiers and, in particular, to transistor amplifiers including temperature compensation means.

The typical transistor comprises a minute body of semiconductive material, such as germanium or silicon, with three attached electrodes designated emitter, base and collector electrodes, which can be interconnected in several different basic circuit configurations to translate signals from an input circuit to an output circuit. In respect of certain of their electrical properties they resemble vacuum tubes, but they are quite different in other respects that are often of critical importance in attempts to secure effects comparable to those obtained with vacuum tubes.

In the vacuum tube circuit art negative or degenerative wave feedback has been successfully incorporated in a wide variety of amplifiers. The advantages of negative feedback include, in one degree or another, reduction of distortion of the signals being amplified and stabilization of the amplifier against variations in the vacuum tubes and their power supply units. Further, in the vacuum tube art it has been found possible in a multistage negative feedback amplifier to achieve conditions (including $\mu\beta >> 1$) such that the over-all gain or forward transmission characteristic of the amplifier is almost exactly equal to, and definitely fixed by, the inverse of the transmission characteristic of the feedback circuit. The latter may comprise only such invariant circuit elements as resistors and condensers so that the feedback and therefore also the over-all gain of the amplifier is correspondingly invariant.

It has been suggested that negative feedback might be applied to transistor amplifiers, as for example, in the manner of the cathode feedback vacuum tube amplifier, and it is a fact that the advantages of negative feedback can be had in some small degree in this way. Those skilled in the art who have examined the problem more closely, however, are aware of certain peculiarities of transistors which seem to preclude attainment of the full benefits of negative feedback including more especially an over-all transmission characteristic that is fixed exclusively by stable passive elements in the feedback circuit. One such peculiarity is that transistor circuit configurations that otherwise might seem adaptable have an input impedance that is only a few ohms, (approximately a short-circuit), as contrasted with the hundreds of thousands of ohms or megohms presented across the cathode and grid of a vacuum tube. Another and formidable peculiarity of transistor circuits is the presence of a significant internal transmission path that itself constitutes a feedback path, and the transmission properties of that path fluctuate with variations in the transistor and its operating conditions. (As exploited in bilateral transistor amplifiers the backward transmission through this internal path may be even greater than the forward transmission through the amplifier.) Further, this backward transmission is not subject to reduction or stabilization by the addition of external negative feedback and so it remains as a variable factor that is incompatible with the objective of an over-all transmission characteristic that is independent of such internal variations.

In any event and so far as the present applicants are aware the art has not known nor envisaged a multistage negative feedback transistor amplifier with transmission characteristics fixed by the characteristics of the feedback circuit. One object of the present invention, therefore, is to provide such an amplifier.

In a multistage amplifier in accordance with the invention the several stages comprise transistors so connected that the backward transmission through the whole sequence of stages is a small fraction of what it is through any one stage. The invention is based in part on the discovery that cascaded stages may be so connected that this condition is in fact realized. In a preferred embodiment the several stages comprise transistors connected in the grounded emitter circuit configuration. With this configuration, and also with certain others, the backward transmission through a series of stages decreases exponentially with the number of stages and at such a rate that with, say three stages, it becomes entirely negligible.

With regard to the low input impedance of transistor amplifier stages, it is noted by way of example that the input impedance of a grounded emitter stage, or of the first of a succession of such stages, may be only a few ohms, which is almost a short-circuit when compared with the output impedance and with the impedances of the external circuits commonly associated with amplifiers. The low input impedance presents two kinds of obstacles, or apparent obstacles, that might seem to preclude attainment of the objectives of the present invention. First, in many applications of vacuum tube feedback amplifiers, a high input impedance of the over-all circuit is essential, as it is for example in the computing direct-current amplifier of K. D. Swartzel, Jr. Patent 2,401,779, June 11, 1946, which presents a high input impedance to each of several signal input circuits. We have found, however, that low input impedance of the first amplifier stage, such as prevails in a grounded emitter transistor stage, is no insuperable obstacle to the realization of high impedances looking into one or more signal input circuits. In some respects, this peculiarity of a transistor can in fact be turned to advantage.

Second, low input impedance in transistor stages other than the first presents difficulties in the supply of suitable biases, and these difficulties become acute when substantial feedback is to be used across a number of stages. Excessive phase shift due to interstage components will limit severely the feedback which can be used without free oscillations appearing. The phase shift due to interstage coupling components may be substantially eliminated by the use of conductive coupling between stages, but this has the serious consequence of exposing the emitter biasing conditions in one stage to amplified bias-changing effects originating in any preceding stage. Emitter biasing conditions being as critical as they are well known to be, the fluctuations in operating conditions to be expected in the input stage are so relatively great as to drive the transistor in, say, the third stage to cut off in one or both directions of cut off.

Notwithstanding the foregoing obstacles, we find that the large amount of negative feedback at zero frequency achieved in a multistage amplifier in accordance with this invention holds the biasing conditions to the critical operative range in the second and following stages and simplifies the control of those conditions in the input stage.

The invention contemplates also a multistage transistor amplifier that can accommodate direct-current signals, and more particularly one that provides in the transmission of such signals the advantages commonly associated with large negative feedback. In this embodiment, too, the several stages are conductively coupled to each other (wherefore the foregoing observations respecting conductive coupling are applicable), and the input and output stages are conductively coupled to the direct-current signal source and the load, respectively. The applied negative feedback operates, at zero frequency, on the biasing conditions and on the direct-current component of the signal, and it can operate to the same, or lesser degree, as desired, on whatever alternating-current signal component may accompany the direct-current component.

Of particular significance in an amplifier embodying the invention is the fact that the grounded emitter circuit can itself provide the phase reversal that is needed for negative feedback at both zero and higher frequencies. The phase reversal in a grounded emitter circuit obtains only if $\alpha$ is less than unity and hence with a feedback circuit present the circuit will regenerate and disable itself by self-oscillation if $\alpha$ in any stage intended to be phase reversing happens to be, or to become, greater than unity.

Although the value of $\alpha$ in any case can be reduced to a safe value below unity by introducing sufficient resistance into the collector circuit, this can be done only as the cost of reduced amplification, for the latter varies at $1/(1-\alpha)$. Further, the resistance so introduced may be adequate for a particular transistor and set of operating conditions and yet be inadequate on replacement of the transistor or upon some uncontrollable change in operating conditions. We perceive that the double-junction transistor (notably the n-p-n junction transistor) is ideally suited for the purposes of the invention in that its $\alpha$ can be made to be inherently always slightly less than unity irrespective of manufacturing variations or normal variations in operating conditions, over a wide frequency range. This type of transistor thus not only provides a high gain factor $1/(1-\alpha)$ but it also insures the phase reversal that is necessary to provide negative feedback and to prevent self-oscillation at any frequency.

It will be understood then that although a multistage transistor amplifier may be called upon to amplify alternating-current signals only, the present invention nevertheless contemplates conductively coupled stages including, in a specific embodiment, an odd number of double-junction transistors in respective grounded emitter stages, with a closed direct-current negative feedback loop all so arranged as to stabilize the emitter biasing conditions in the several stages at their respective optima. Provision may be made, too, for applying and removing the alternating-current signal without disturbing the operation of the direct-current circuit, for reducing signal distortion by negative feedback also, if desired, and for maintaining the over-all signal transmission characteristic fixed by invariant negative feedback elements. The bias stabilization of the second and subsequent stages in such an embodiment is effectively equal to the feedback-improved stabilization in the first stage. Hence, the need for special individual bias-stabilization in every stage is obviated and the circuit enjoys improved bias-stabilization limited only by the stabilization in the first stage.

It will be understood further that a direct-current amplifier embodying the present invention may comprise, in specific form, an amplifier of the foregoing description but with conductively coupled signal input and output circuits and with negative feedback operative on at least the direct-current component of the signal.

In accordance with a further feature of the invention the first stage of the conductively-coupled transistor amplifier is provided with a supplemental bias-stabilizer so that the advantage of greater stabilization in that stage is communicated to and enjoyed by each following stage.

Other features, objects and advantages of the present invention will appear on consideration of the specific embodiments illustrated in the accompanying drawings and hereinafter described. In the drawings.

Figure 1:
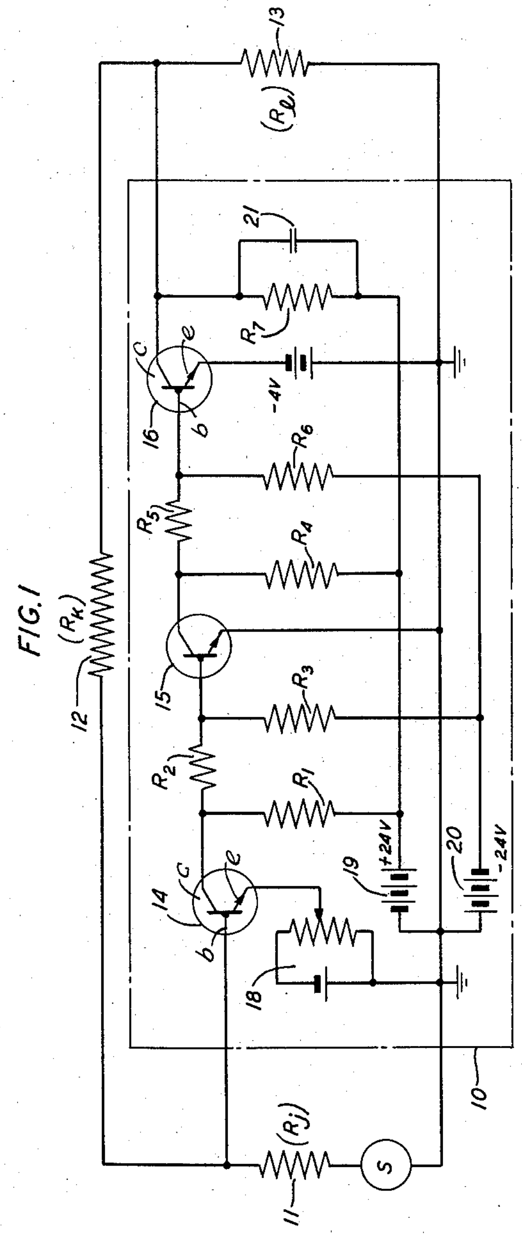
Fig. 1 illustrates schematically a system in accordance with the invention adapted for the amplification of direct-current signals.

Referring more particularly now to Fig. 1 the amplifying system there shown comprises in outline a three-stage amplifying section 10, an input circuit resistor 11 of resistance $R_j$, a feedback resistor 12 of resistance $R_k$, a direct-current signal source S and a useful load of resistance $R_l$ symbolized by a resistor 13. The amplifying section 10 comprises in respective amplifying stages, three transistors 14, 15, 16, each having a base electrode *b*, an emitter electrode *e* and a collector electrode *c*. In each stage the transistor is arranged in the so-called grounded-emitter circuit configuration in which the input and output circuits have a common connection to the emitter *e*, and the specific circuit proportions are such that each emitter is maintained at a potential substantially fixed relative to ground irrespective of variations in the strength of the signal being amplified.

The relative values of the several self- and transfer-impedances in the circuit and their orders of magnitude are of such importance to an understanding of the detailed design and operation that it is well to have them in mind at the outset. For this purpose values appropriate to a specific example in practice will be included in the detailed description of the Fig. 1 system that follows. It may be assumed for the present that the three transistors are substantially alike and that they are n-p-n double junction germanium transistors such as those treated by Wallace and Pietenpol in the Proceedings of the I.R.E., volume 39, No. 7, pages 753–767, July 1951. Typical values for the elements of the equivalent circuit of such a transistor are as follows:

$$\begin{aligned} r_e &= 25.9 \text{ ohms} \\ r_b &= 240 \text{ ohms} \\ r_c &= 13.4\times 10^6 \text{ ohms} \\ r_c - r_m &= 0.288\times 10^6 \text{ ohms} \\ \alpha &= 0.9785 \end{aligned} \tag{1}$$

and the current multiplication factor $\alpha$ is:

$$\alpha = \frac{r_m + r_b}{r_c + r_b} \cong \frac{r_m}{r_c} \tag{2}$$

The four-pole parameters of a single grounded-emitter stage, and their typical values, are the input impedance $R_{11}=r_e+r_b=266$ ohms; the output impedance $R_{22}=r_e+r_c-r_m=0.288$ megohm; the forward transfer impedance $R_{21}=r_e-r_m=-13.1$ megohms; and the backward transfer impedance $R_{12}=r_e=25.9$ ohms.

It will be assumed further that in the specific example the load resistance $R_l$ is 10,000 ohms, that the signal source S has negligible internal resistance and delivers signal voltages ranging from $-4$ to $+10$ volts relative to ground, that the voltage gain of the system is to be unity and that there is to be no voltage across the load when the input signal voltage is zero. In the first stage the base of transistor 14 is connected to the junction of resistors 11 and 12, while the emitter is connected to ground through a potential divider 18. The potential divider 18 comprises a resistance element of 100 ohms resistance and a 2-volt battery poled to apply a negative bias to the emitter. This provides an adjustment for setting the zero of the system.

Each of the interstage coupling circuits in Fig. 1 comprises a pi-network of resistors with respective oppositely-poled, direct-current, 24-volt sources 19 and 20 in the respective shunt legs. The first interstage circuit comprises a resistor $R_1$ of 50,000 ohms connected between the collector of transistor 14 and the ungrounded or positive pole of its associated source 19, a resistor $R_2$ of 6800 ohms conductively connecting the collector of transistor 14 and the base of transistor 15, and a resistor $R_3$ of 100,000 ohms connected between the base of transistor 15 and the ungrounded or negative pole of its associated source 20. It is to be noted that $R_2$ is very small in comparison with both $R_1$ and $R_{22}=(1-\alpha)r_c$ of the transistor, which is desirable from the standpoint of high short-circuit current gain. The current gain of the first stage is approximately equal to the short-circuit gain of the transistor 14, which is approximately $-1/(1-\alpha)$ or 45 in the example given. With the base of the transistor 15 at ground potential the collector of transistor 14 will rest at about 1.6 volts positive and the collector current will then be about 200 microamperes.

Similar considerations underlie the design of the second interstage network in which $R_4$ has a value of 33,000 ohms; $R_5$, 27,000 ohms; and $R_6$, 100,000 ohms. With these values the collector of transistor 15 stands at about 1½ volts positive when the potential of the base electrode in the last stage is 4 volts negative. The voltage drop across $R_5$ is then about 5½ volts and the second-stage collector current about 500 microamperes.

The value of the resistance $R_7$ in the collector circuit of the last stage was fixed at 10,000 ohms so that with a collector voltage of 10 volts the collector current of the last stage is 400 microamperes and large loop gain is insured. The emitter in that stage is returned to ground through a biasing source of —4 volts, corresponding to the desired minimum output voltage. A condenser 21 of 1 microfarad capacitance is connected across resistor $R_7$ to reduce any tendency of the amplifying system to oscillate at high frequencies, such as the 300 kilocycles that was observed in one instance.

The connection shown for load 13 is appropriate for a load of which one terminal is grounded. In other cases it may be feasible to return the load connection to the ungrounded terminal of the output collector voltage source 20, and to increase the resistance of $R_7$ accordingly in the interests of greater efficiency.

Reference was made hereinbefore to the backward transfer impedance $R_{12}$ of the grounded-emitter stage. It is this parameter that accounts for the inherent backward transmission to which reference has been made. External negative feedback has no effect on it, neither reducing it nor stabilizing it against variation in operating conditions. We find however, that the backward transfer impedance is reduced by many thousand-fold if there are two or more grounded-emitter stages in cascade. For two tandem stages this transfer impedance is reduced to $$R_{12}=\frac{r_e}{2+r_b/r_e+(r_c-r_m)/r_e} \qquad (3)$$

or from 25.9 ohms to 0.002 ohm in the typical case. The addition of a third stage effects a further large reduction, thereby insuring that the internal feedback is entirely negligible and of no consequence whatever its variations may be.

The voltage gain of the feedback amplifier in Fig. 1 can be shown to be as follows:

$$G=-\frac{R_k}{R_j}\,\frac{1}{1-1/\mu\beta}\doteq-\frac{R_k}{R_j} \qquad (4)$$

where $$\mu\beta=\frac{\alpha_1\alpha_2\alpha_3}{(1-\alpha_1)(1-\alpha_2)(1-\alpha_3)\left[1+\frac{R_k}{R_L}+\frac{R_k}{(1-\alpha_3)r_{c3}}\right]} \qquad (5)$$

the subscripts 1, 2, 3 referring to the first, second and third stages respectively.

The values of $R_j$ and $R_k$ affect the voltage gain of the amplifying system as shown in Equation 4 and for a unity gain amplifier are assigned equal values, of 100,000 ohms each for specific example. Considering now the current feedback in the system it will be observed that the collector current of transistor 16 divides itself among several parallel paths, one comprising resistor $R_7$ (10,000 ohms), another the useful load $R_1$ (10,000 ohms), and the third a path comprising $R_k$ in series with the parallel combination of $R_j$ (100,000 ohms) and the input impedance $R_{11}$ of the first stage. $R_{11}$, if not zero, is so small in comparison with $R_j$ that the latter has practically no tendency to divert the feed-back current. As a practically important consequence, $R_j$ can be varied over a wide range (and correspondingly also the voltage gain) without affecting the feedback, i.e., $\mu\beta$.

Since the first stage works into what is substantially a short-circuit, $R_{11}$ may be as high as $R_e/(1-\alpha)$ or about 1000 ohms but even in this extreme case $R_j$ can be reduced to the order of 3000 ohms (with corresponding increase in the voltage gain of the system) before further reduction in $R_j$ will begin to reduce the feedback. If $R_j$ equals $R_k$ and $R_{11}$ is finite, the feedback will be maximum when $R_j$ and $R_k$ are of the order of the root mean square of $R_{11}$ and $R_{22}$.

Thus the Fig. 1 amplifying system is one in which the input impedance and voltage gain can be varied widely without substantially affecting $\mu\beta$ and it is one also in which $\mu\beta$ is relatively independent of the resistance of the source. (The latter resistance has been assumed to be negligible but it need not be so, for it can be regarded as a part of the input resistance $R_j$.) Further, the voltage gain is relatively independent of $\mu$ and of the load resistance.

The benefits of feedback in the Fig. 1 system are reflected in such results as the following. Inasmuch as the gain of a grounded emitter stage is due to local positive feedback (reflected in the gain factor $1/(1-\alpha)$) one might surmise that the system would not be stable with variations in $\alpha$, but it is found, however, that such small variations in $\alpha$ as may occur in any one stage are reduced in their ultimate effect by 30 decibels. A three-volt change in the supply voltages in the second and third stages produces no measurable change in the output voltage. The effect of a similar change in the first stage is reduced by a factor of 15. The effect of variations in the magnitudes of the load resistance and the bias resistances was negligible. If the amplifier were ideal the base current in the first stage would not vary as the amplifier is driven over its entire operating voltage range. Actually it was found that the output voltage could be varied from —2 volts to +23 volts with a change in this base current of only 0.7 micrampere. The resulting error of 0.07 volt across the load for a 25-volt change in output voltage is eminently satisfactory and corresponds to 51 decibels of feedback. In the output voltage range from zero to 10 volts the change in base current was less that 0.2 microampere so that the error signal was less than 0.02 volt, corresponding to 54 decibels of feedback.

Figure 2:
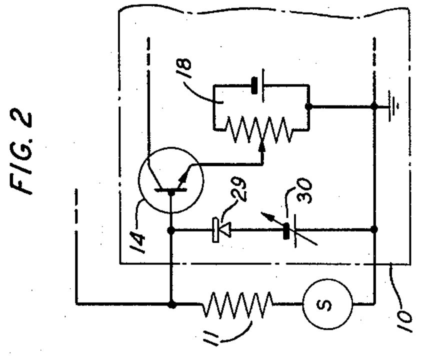
Fig. 2 illustrates a drift compensating circuit for the Fig. 1 system.

If the Fig. 1 amplifier system is to be called upon to operate over a wide range of ambient temperature the output voltage is liable to drift as the temperature varies and therefore necessitate readjustment of the "zero set" i.e., potentiometer 18. The drift effect is identifiable with a change, with temperature, in the base current of the first-stage transistor 14, due to the decrease in the collector resistance with temperature. This effect causes the magnitude of the base current to increase exponentially. It is the flow of this increased base current through $R_j$ and $R_k$ that makes the output voltage a function of temperature. To prevent the output voltage from varying with temperature it is only necessary to provide a current sink into which the increased base current can flow. By this means the current through $R_j$ and $R_k$ is made independent of temperature as is the output voltage. The current sink can be provided by a junction diode because the back current for such a diode follows the same exponential law with temperature as does the base current of the junction transistor. The n-p-n junction transistor has a base current which flows out of the base terminal. If a junction diode is connected between the base terminal and a negative voltage and poled so that its back current flows, then the negative voltage to which it is returned can be adjusted in magnitude so that as temperature varies, the increased base current will flow into the diode and there will be substantial compensation for temperature effects. It should be noted that the incremental resistance in such a junction diode can be made much higher than $R_j$ and $R_k$ and can be made independent of temperature, so that addition of the diode does not cause any variation in the gain of the amplifier. Drift compensation can be provided, then, as illustrated in Fig. 2 by the junction diode 29 interposed between the base lead of transistor 14 and the ungrounded or negative pole of the adjustable direct-current voltage source 30.

Figure 3:
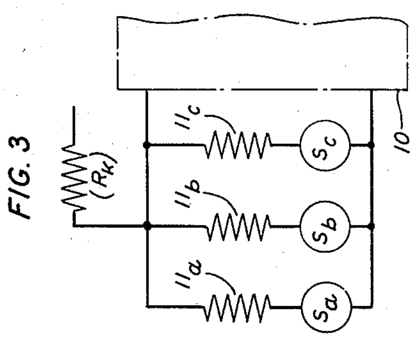
Fig. 3 illustrates a modification of the Fig. 1 system constituting a summing amplifier system.

The Fig. 1 amplifying system is well adapted for use in a variety of different circumstances encountered in practice, wherever direct-current amplification is required, as in a servo control application where a direct-current voltage from a high impedance instrument must be amplified. It is also suitable for use in the transistor equivalent of such items of test equipment as vacuum tube voltmeters. For further example it is especially well adapted for use in analogue computers as a summing amplifier. In such use, as illustrated in Fig. 3, the several low-impedance sources $S_a$, $S_b$, $S_c$, etc., of direct current are connected to the input of the system, in the same manner as source S in Fig. 1, through respective high resistances $\mathbf{11}_a$, $\mathbf{11}_b$, $\mathbf{11}_c$, etc. The load voltage (or current) is then equal to the sum of $$S_a\left(\frac{R_k}{R_{11a}}\right)+S_b\left(\frac{R_k}{R_{11b}}\right)+S_c\left(\frac{R_k}{R_{11c}}\right)$$

In describing the Fig. 1 system as one for the amplification of direct-current signals the intention has been to emphasize the presence of a direct-current signal companent and not the absence of alternating-current components. The latter may be present also and they may extend over a frequency range of many kilocycles.

It may be desirable in some cases to employ a contact transistor, such as the type A, in the first stage of the amplifier with a view to obtaining an effective $\alpha$ that is closer to unity. This has the disadvantage previously mentioned of requiring precise adjustment of resistance but it is feasible inasmuch as the change in base current in the first stage with change in signal input is found to be negligible, e.g. a fraction of a microampere. Further, it is to be understood that although a shunt-type feedback connection has been described, a series-type connection may be employed equally well if appropriate changes are made in the circuit configuration.

Figure 4:
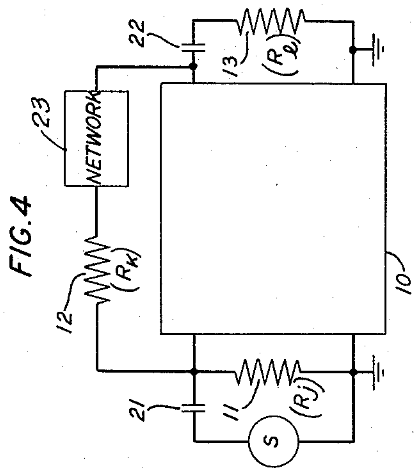
Fig. 4 illustrates schematically an alternating-current signal amplifying system embodying the invention.

Referring now to Fig. 4 there is shown schematically an amplifying system in accordance with the invention adapted for alternating-current signals supplied by signal source S. The system comprises the amplifying section 10 of Fig. 1 and also the resistors 11 and 12 of that figure; but the direct-current signal source of Fig. 1 is omitted and resistor 11 is connected directly to ground. The alternating signal source S in Fig. 4 is connected, through a blocking condenser 21, across resistor 11, that is, across the input terminals of amplifying section 10. The load 13 is connected similarly, through a blocking condenser 22, to the output terminals of section 10. The two blocking condensers serve only to prevent the source and load from disturbing the distribution of direct current in the remainder of the system, and they may be omitted if the signal input and output circuits are otherwise opaque to direct current.

In Fig. 4, then, the direct-current feedback loop of Fig. 1 is preserved intact, and so also are the previously described advantages of large direct-current negative feedback including specifically the stabilization of the direct-current operating points of the several transistors. There is negative feedback for signal frequencies also, the amount of such feedback depending in part on the impedances of source, load and feedback connection. A frequency-selective network 23 can be interposed in series with feedback resistor 12 to reduce the signal feedback and to shape the over-all amplification frequency characteristic as desired. Such a network, transparent to direct current, may be employed likewise in Fig. 1. In the absence of network 23 the signal current gain is given approximately by $R_k/R_l$ and it is approximately 100 if, $R_k$ being 100,000 ohms, $R_l$ is 1000 ohms for specific example. If the network is opaque at all signal frequencies, the signal current gain is approximately $$\frac{-\alpha_1\alpha_2\alpha_3}{(1-\alpha_1)(1-\alpha_2)(1-\alpha_3)}\times\frac{1}{1+R_L/(1-\alpha_3)r_{c3}} \qquad (6)$$

Although the present invention has been described largely with reference to certain specific embodiments, various modifications within the spirit and scope of the invention will occur to those skilled in the art.

What is claimed is:

1. In circuit combination, a double-junction transistor having base, emitter and collector electrodes interconnected in grounded-emitter circuit configuration, circuit means including a source of direct current connected to said electrodes to supply biasing currents thereto, and a reverse-biased junction diode connected between said base and emitter electrodes to absorb variations in base current incident to changes in temperature of said transistor.

2. An amplifier comprising a double junction transistor having emitter, base and collector electrodes, means for applying signals to be amplified between said base and emitter, an output circuit connected between said collector and emitter and means for compensating for temperature induced variations in the base current of said transistor, said temperature compensating means comprising a junction diode whose current in the reverse direction varies with temperature in approximately the same manner as does said base current, means for connecting said diode between said base and emitter electrodes and means for biasing said diode in its reverse conducting condition.

3. An amplifying system comprising an odd number of tandem connected conductively coupled stages, each of said stages comprising a double junction transistor having base, emitter and collector electrodes and connected in grounded emitter configuration, a direct-current feedback path from the output of the last of said stages to the input of the first of said stages, and a compensating circuit individual to said first stage to compensate for variations with temperature in the base current of the transistor in said first stage, said compensating circuit comprising a junction diode connected between the base and emitter electrodes of said first stage transistor, said diode having a back current characteristic which follows approximately the same exponential law with temperature as does the base current of said first stage transistor, and means for biasing said diode so that its back current flows.

4. An amplifier comprising a double junction transistor having emitter, base, and collector electrodes, means applying signals to be amplified between said base and emitter, an output circuit connected between said collector and emitter and including a load and a point of fixed potential, means for compensating for temperature induced variations in the base current of said transistor, said temperature compensating means comprising a junction diode whose current in the reverse direction varies with temperature in substantially the same manner as does said base current, and means connecting said diode between said base and said point of fixed potential, said last named means including means for biasing said diode in its reverse conducting direction.

5. An amplifying system comprising an odd number of conductively-coupled amplifying stages, each of said stages comprising a double-junction semi-conductor amplifier element having base, emitter and collector electrodes interconnected to form a grounded-emitter circuit, a signal input circuit connected between the base and emitter electrodes in the first of said stages, said input circuit having a direct-current resistance that is at least several times as great as the resistance presented between said last-mentioned electrodes by the amplifying element in said first stage, a conductive negative feedback connection extending from the output of the last of said stages to the input of the said first stage, means for supplying biasing currents to said electrodes, a temperature-dependent resistance element comprising a junction diode having a temperature-dependent conduction characteristic which opposes temperature-induced variations in the base current of said first stage, means connecting said junction diode in a circuit interconnecting the said base and emitter electrodes of the said first stage and means for applying a reverse bias to said diode.

6. An electrical signal translation circuit comprising a transistor having base, emitter, and collector electrodes, input circuit means for supplying signals between said base electrode and a point of reference potential, an output circuit connected between said collector electrode and said point of reference potential, the current flowing in said base electrode being subject to variations in a predetermined manner with changes in the temperature of said transistor and means for reducing said variations comprising a rectifier whose reverse current also varies with temperature in substantially said predetermined manner, means including said rectifier in a circuit connected between said base electrode and said point of reference potential and means for biasing said rectifier to conduct only in the reverse direction.

References Cited in the file of this patent

UNITED STATES PATENTS

| | | |
|---|---|---|
| 2,269,590 | Lewis | Jan. 13, 1942 |
| 2,313,096 | Shepard | Mar. 9, 1943 |
| 2,401,779 | Swartzel | June 11, 1946 |
| 2,517,960 | Barney et al. | Aug. 8, 1950 |
| 2,531,076 | Moore | Nov. 21, 1950 |
| 2,541,322 | Barney | Feb. 13, 1951 |
| 2,620,448 | Wallace | Dec. 2, 1952 |
| 2,644,895 | Lo | July 7, 1953 |
| 2,647,958 | Barney | Aug. 4, 1953 |
| 2,757,243 | Thomas | July 31, 1956 |

OTHER REFERENCES

Bell text, "The Transistor," pub. 1951 by Bell Telephone Labs. Inc., pages 184–188, 365.